United States Patent [19]

Connolly et al.

[11] 4,452,823
[45] Jun. 5, 1984

[54] PACKAGED FROZEN FOOD PRODUCT

[75] Inventors: James M. Connolly, Dover, Mass.; Robert G. Morley, Stone Mountain; W. Ronald Ashton, Duluth, both of Ga.

[73] Assignee: Landwide Foods, Inc., Dover, Mass.

[21] Appl. No.: 483,766

[22] Filed: Apr. 11, 1983

Related U.S. Application Data

[63] Continuation of Ser. No. 228,546, Jan. 26, 1981, abandoned.

[51] Int. Cl.³ ........................... A23G 9/28; A23G 9/02
[52] U.S. Cl. .................................... 426/115; 426/111; 426/130; 426/565; 426/394; 222/99
[58] Field of Search ............... 426/565, 566, 567, 658, 426/115, 111, 130, 394; 222/96, 99

[56] References Cited

U.S. PATENT DOCUMENTS

| 797,775 | 8/1905 | Lustig | 426/115 |
|---|---|---|---|
| 2,110,615 | 3/1938 | Wilcox | 426/115 |
| 2,157,476 | 5/1939 | Brodesser | 426/115 |
| 2,248,963 | 7/1941 | Copeman | 426/393 |
| 2,563,278 | 8/1951 | Rummel et al. | 426/393 |
| 3,113,873 | 12/1963 | Krause | 426/115 |
| 3,782,768 | 11/1972 | Finucane et al. | 426/565 |
| 3,949,102 | 4/1976 | Hellyer et al. | 426/565 |
| 4,145,454 | 3/1979 | Dea et al. | 426/565 |
| 4,178,390 | 12/1979 | Igoe | 426/565 |

Primary Examiner—Jeanette M. Hunter
Attorney, Agent, or Firm—Lahive & Cockfield

[57] ABSTRACT

A packaged frozen food product has a container with a collapsible chamber fitted with a spout and filled with a frozen dessert food. The dessert food at home freezer temperatures is extrudable from the container upon collapse of the chamber for serving directly into a dish or onto a cone.

5 Claims, 5 Drawing Figures

PACKAGED FROZEN FOOD PRODUCT

This is a continuation of application Ser. No. 228,546, filed Jan. 26, 1981 now abandoned.

BACKGROUND OF THE INVENTION

This invention provides a new packaged frozen food product, principally for dessert use, that makes the features of soft serve ice cream available in the home.

The new product is a frozen food within a container from which it can be extruded at home freezer temperatures. More particularly, the packaged food product of the invention has a container with a collapsible chamber fitted with a spout and filled with the frozen food. The frozen food is extrudable from the container upon collapse of the chamber, for serving directly into a dish or onto a cone, at home freezer temperatures. Manual pressure typically is sufficient to collapse the chamber to dispense the frozen food. The frozen food typically is a dessert that emulates features of soft serve ice cream but at such lower temperatures as to be suitable for prolonged storage in store and home freezers. The dessert food is described further in the pending application for "Frozen Dessert Product" Ser. No. 210,846 filed Nov. 26, 1980; now U.S. Pat. 4,346,120; and in the two continuations-in-part thereof filed concurrently with this application and entitled "Frozen Dessert Food", Ser. No. 228,557 filed Jan. 26, 1981 now U.S. Pat. No. 4,400,406, and "Dietetic Frozen Dessert Food", Ser. No. 228,550 filed Jan. 26, 1981 now U.S. Pat. No. 4,400,405. The contents of all three said applications are incorporated herein by this reference.

Soft serve ice cream, or simply soft serve, is a highly popular dessert with wide appeal. The soft serve industry has grown to such an extent that it is recognized as a distinct segment of the frozen dessert field and encompasses manufacturers and retailers of soft serve products, and suppliers of processing equipment for the product.

Distinguishing features of conventional soft serve are that it is frozen in a special soft serve freezer, is dispensed by extrusion at carefully chosen sub-freezing temperatures and stands up on a cone or dish upon extrusion. Soft serve generally is consumed almost immediately after extrusion from the soft serve freezer and hence essentially at the extrusion temperature.

Although soft serve of this character has been marketed for many years, it is still available only from stores having special freezers that dispense the product for immediate consumption. This is because the product generally is dispensed at temperatures between 16° F. and 21° F. (−9° C. to −6° C.). At lower temperatures, the product is no longer sufficiently soft. Conventional soft serve accordingly is not suited for sale from grocery store freezers for home storage and dispensing. Home freezers maintain temperatures generally around 0° F. to 10° F. (−18° C. to −12° C.), and store freezers, which as used herein includes grocery store, supermarket, and restaurant freezers, are generally at colder temperatures.

Others have expended considerable effort to develop a soft serve product for home use, but apparently without success. U.S. Pat. Nos. 4,146,652; 4,154,863; 4,199,605; 4,199,604; 4,145,454; and 3,993,793 and U.K. Patent Specification No. 1,508,437 disclose frozen food products which supposedly are softer than usual at freezer temperatures. However, none is understood to provide a soft serve-like product for home consumption suitable for purchase from a store freezer and storage in a home freezer. There is considerable other published art on the subject of frozen desserts, particularly ice cream. A recent text is *Ice Cream, Second Edition* by W. S. Arbuckle, Ph.D., published in 1972 by the Avi Publishing Company, Inc., Westport, Connecticut.

It is accordingly an object of this invention to provide a packaged frozen food product suited for storage in a home freezer and for dispensing by extrusion from the package directly after removal from that freezer.

It is a further object of the invention to provide a packaged soft serve frozen dessert product suited for home freezer storage.

The invention further seeks to provide a packaged frozen food product which emulates features of conventional soft serve but for serving at the significantly lower temperatures standard in home freezers.

Another object of the invention is to provide a packaged frozen food product having a container with a collapsible food-filled chamber and which is economical for large-scale commercial marketing for home consumption.

Other objects of the invention will in part be obvious and will in part appear hereinafter.

The invention accordingly comprises a packaged frozen food product possessing the features, the combination and the relation of elements exemplified in the product hereinafter described. The scope of the invention is indicated in the claims.

BRIEF DESCRIPTION OF DRAWINGS

For a fuller understanding of the nature and objects of the invention, reference should be made to the following detailed description and the accompanying drawings, in which.

THE INVENTION

A packaged frozen food product according to the invention employs a container with a food chamber that is collapsible and liquid-tight except at a dispensing spout. The container and chamber structure, by way of non-limiting examples, can be similar to a large tube closed at one end and with a spout at the other, or similar to a pouch such as is used in administering parenteral fluids and an example of which is disclosed in U.S. Pat. Nos. 4,088,166 and 4,090,541. The frozen food in the container typically resembles conventional soft serve ice cream, but is extrudable at the comparatively low temperatures of a home freezer. The spout is secured to the chamber, typically in a manner as disclosed in U.S. Pat. No. 3,152,727; or No. 3,894,381. A removable and replaceable cap is preferably provided to seal the spout during storage and between the dispensing of servings. Where desired, an outer wrap can enclose the filled and sealed chamber structure during distribution and storage, for removal by the consumer.

The chamber preferably is configured to attain efficient application of the chamber-collapsing force to the frozen food, to extrude the food out of the chamber with minimal applied force. Manual pressure directly on a pouch-like chamber is sufficient to extrude at least some frozen food. Where desired, the container-chamber structure can include a mechanism for applying the manual force to the chamber with a mechanical advantage. The invention further comprehends the use of an externally-powered, e.g. electrically operated, chamber-collapsing mechanism.

The container-chamber structure can include manually-engageable portions at which a consumer may hold the product and, in at least some instances, apply manual force to collapse the chamber for extruding a serving of the frozen contents. These manually-engageable portions preferably include thermal insulation to protect the consumer's hands from discomforting cold. The insulation can also protect the frozen food from being warmed by the consumer's hands. The insulation, moreover, can enclose the chamber or otherwise be arranged to protect the frozen food from brief exposure to tempering or above-freezing temperatures.

The packaged food product brings into the home a new frozen dessert similar to the conventional soft serve ice cream that was heretofore available only for immediate consumption at a store having a special soft serve freezer. That is, the new packaged product typically is manufactured and distributed in a manner similar to the practices common for packaged ice cream marketed in grocery stores and supermarkets. A purchaser of the new product stores it in a home freezer, and dispenses servings simply by extrusion from the container, at the home freezer temperature.

The features of conventional soft serve which are important to consumers include the organoleptic properties of taste, after taste, and mouth feel. Many of these are subjective properties and hence not readily measured or quantified. For example, one important taste characteristic which has been difficult to attain in a frozen dessert which is soft enough for extrusion at home freezer temperatures is the absence of a burning sensation. Features of standard soft serve also include the ability to be extruded, particularly as a substantially continuous ribbon or rod, and to be coiled on itself in a conical beehive-like manner. Standard soft serve in addition is to retain the extrudate shape, and have the ability to stand up in a cone or dish without sagging, sufficient body strength so as not to slip or fall sideways when the cone or dish tips, and the proper bite resistance so that the consumer can either lick the product or bite and chew it with a satisfactory mouth feel. The soft serve is to retain these latter properties, in addition to resistance to melting and dripping, for a sufficient time—typically ten minutes at room temperature e.g. 68° F.—until the serving is eaten.

Other properties of a frozen dessert that is to be sold in a grocery store for home storage and dispensed by extrusion include prolonged storage life without deterioration, whether visible or taste perceptable. The product is also to resist thermal shock, i.e. resist deterioration when subjected to varying temperatures. Temperature variations occur normally in a freezer as the equipment cycles, especially through frost-free operation. An extreme thermal shock occurs when the food is warmed to a near melting temperature and then re-chilled to a freezer temperature, as can occur during transfer of the product from the store freezer to the home freezer.

Stated more technically, a frozen soft serve dessert that can be dispensed by extrusion requires deformation and flow properties, i.e. rheological characteristics, that enable the frozen product, when subjected to reasonable extrusion forces, to become sufficiently fluid to flow through the extrusion nozzle. This performance involves the rheological characteristic termed shear thinning. The extrudate is to be a continuous rod or ribbon. The extruded product, however, must essentially immediately set-up, i.e. lose the shear-responsive fluidity, in order to retain the extrudate shape and to stand up on a cone or dish. Yet the extruded product preferably is to be sufficiently bendable upon extrusion to be coiled on itself, as noted for conventional soft serve. These characteristics of the frozen dessert product may collectively be termed coneability. Commercial soft serve is coneable, in that it can be extruded with a rod-like shape and immediately coiled in sequential layers on a cone or dish to provide a spiraled serving that tends to retain its shape.

The attaining of this performance with a product at home freezer temperatures requires flow properties different from those of conventional soft serve. They are also different from those of regular ice cream, which cannot be dispensed by extrusion when at home freezer temperatures, but rather requires, as known, scooping or dipping with a tool.

Properties of the frozen material important to attaining the foregoing extrudability and coneability include yield value at the desired extrusion temperature, viscosity, shear thinning value at the extrusion temperature and shear rate, relaxation time, and lateral resistance.

Yield value is a measure of the material strength, and particularly the resistance to deformation and flow, as determined, for example, from measurements made with a cone penetrometer. A moderate yield value is desired, at home freezer temperatures, in order that the food be extrudable using hand pressure.

A material with too high a yield value is unduly hard to extrude. Too low a value means the material is unduly soft, will flow too readily, and the extrusion may be difficult to control. The yield value which this invention attains is similar, at freezer temperatures as low as on the order of 0° F., to that of conventional soft serve at around 18° F., and may be less but is not appreciably higher.

Viscosity is a property of fluids which relates to resistance to flow. A relatively high viscosity, e.g. significant stiffness, is desired in the absence of an applied extrusion pressure, for the material to be coneable. On the other hand, a relatively low viscosity is desired for ease in extrusion when the material is under a manually-applied pressure and for ease in bending the extrudate into layered coils on a dish or cone.

Shear thinning value is of significance in determining the rate at which a material flows under particular conditions. It concerns the relative drop in viscosity of the material which occurs upon extrusion. Under defined conditions of temperature and orifice size, the shear thinning value is significant in determining the extrusion rate of the product when subjected to a given shear stress. This in turn is important in determining the speed and the ease with which a serving portion can be extruded.

Relaxation time is the time, typically in seconds, for the dessert food to set up after extrusion at the specified temperature. It is measured as the time required for the yield value of the frozen dessert to return to 63.2% of its pre-extrusion value after removal of the pressure which induced the extrusion flow. The relaxation time is to be sufficiently long to allow each successive coiled layer of the extruded dessert to form and to bond to another layer, but short enough so that a cone of the material can be handled, and even tipped, promptly after being dispensed.

Lateral resistance is the elastic strength of the material to resist deformation. The lateral resistance important in the context of this invention can be measured as the force necessary to bend permanently a cylindrical or other rod-shaped extrudate of the frozen product, with given dimensions, at the extrusion temperature. This lateral resistance hence identifies the ability of an extruded conical serving of the product to maintain the extruded shape, e.g. to resist deflection and bending, and for layers of the product to stand up in tiers.

It has been found that a new soft serve dessert food can be formulated and prepared which amply satisfies the foregoing objectives and criteria, as set forth more fully in the two continuation applications identified above as filed concurrently herewith. The food is prepared ready for consumption and packaged for a consumer to purchase from a store freezer. The consumer stores the packaged product in a home freezer, which as used herein includes the freezer section of a home refrigerator, and dispenses the dessert food directly from the package for consumption. The food preferably is in a package which can be manipulated to extrude the frozen food under hand pressure to yield a serving which is essentially the same in appearance, as well as in taste, as conventional soft serve dispensed from a soft serve freezer.

The new frozen food additionally appears capable of commercial distribution. Specifically, it withstands hard-freeze warehouse storage, distribution shipment at above-zero Fahrenheit temperatures, and storage in grocery store and home freezers, as well as the tempering which frozen groceries typically encounter in transport from store to home.

The frozen food for practice of the invention can be formulated with ingredients which provide the fat, protein, water and flavor constituents common in frozen desserts, and further has multi-ingredient sugar, stabilizer and emulsifier systems. The frozen food can also be prepared without a separate fat constituent and hence be essentially free of fat. The packaged product of the invention then provides a low-fat dietetic food.

One particular feature of the frozen food preferred for practice of the invention is that it has both unusually low specific gravity and substantial body and chewiness. The formulation of the frozen food enables it to be whipped with significantly more air than is common for ice cream, and thereby to attain the desired low specific gravity. The ice cream and the soft serve industries describe the amount of air in a product as overrun. This term measures the percentage by which the volume of the liquid mix for a product is increased during whipping and freezing. Thus, when one gallon of mix produces two gallons of finished product, the overrun is 100%.

The overrun of the frozen food for this invention typically is greater than 100% and can exceed 200%. The latter value is twice the overrun normally found in regular ice cream and is approximately four times the 40–60% overrun common for conventional soft serve. It is understood that neither regular ice cream mix nor conventional soft serve mix can take 200% overrun and remain appetizing. By contrast, the new frozen food is highly appetizing. In fact, the body, texture and mouth feel of that food have been judged to be very acceptable and satisfactory.

Another feature of that frozen dessert is that it is essentially free of "burn". Consumers have identified this perception of a burning sensation on the tongue and in the throat as a serious drawback of products with depressed freezing points. It is believed that the sensation is due to dehydration caused by the additional sugars commonly used as freezing-point depressants. The prior heavy use of sugars also has caused a cloying sweetness.

The preferred frozen dessert attains significant freezing point depression without a significant burn sensation and without undue sweetness. Separate consumer tests have confirmed that the dessert indeed has the proper sweetness and a pleasing, burn-free after taste.

DESCRIPTION OF ILLUSTRATED EMBODIMENT

Figures 1, 2, 3:
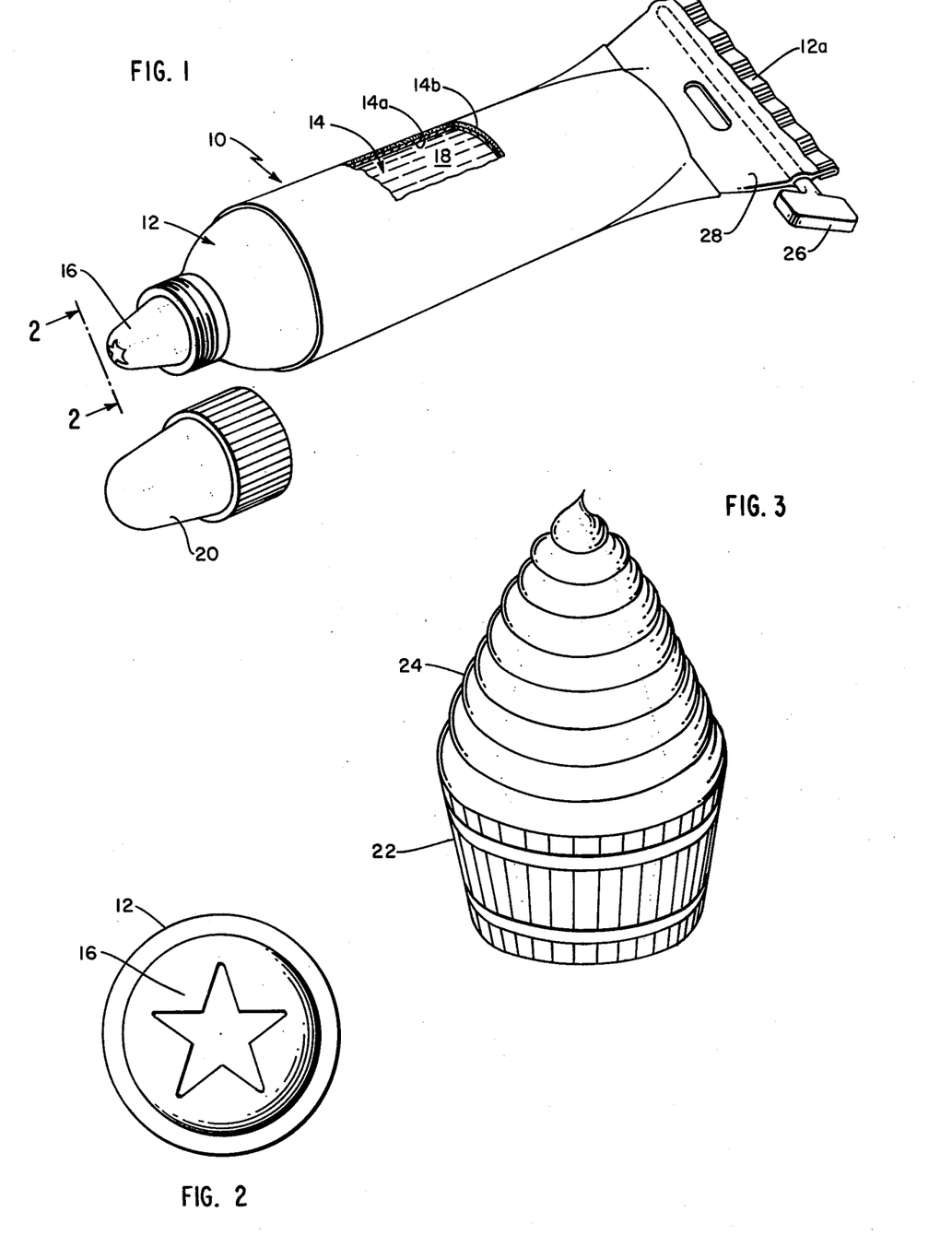
FIG. 1 shows a packaged frozen food product, partly broken away, according to the invention.
FIG. 2 is a view of the nozzle end of the packaged product of FIG. 1.
FIG. 3 shows a serving of dessert food illustrative of that obtained from a packaged product according to the invention.

FIG. 1 shows a packaged product 10 according to the invention and having a tooth-paste tube-like container 12 that has an interior chamber 14 that is fluidtight except at a dispensing spout 16. The container carries a frozen dessert food 18. A replaceable cap 20 normally seals the spout 16, and is removable to dispense the dessert food. The illustrated spout 16 forms a dispensing passage having a star-shaped cross section, as shown in FIG. 2, to impart a fluted configuration to the dessert food being extruded.

The container 12 and chamber 14, compatible for food storage, are collapsible to expel the dessert food 18 by extrusion through the spout 16. The consumer can squeeze the container to collapse the chamber and thereby subject the contents to sufficient pressure for extrusion. FIG. 3 shows a cup 22 filled with a coiled cone 24 of the frozen food 18 extruded from the package 12 in this manner, but without showing fluting of the extrudate.

The illustrated container 12 also has a key 26 affixed to the crimped end 12a opposite the spout 16. The container is structured to be wound on the key 26 to facilitate collapsing of the chamber to extrude the frozen contents. It will be apparent that mechanical aids other than the key 26 can be provided to facilitate the extrusion dispensing of the dessert food from the container.

The illustrated container 12 in addition forms an apertured, flat hang-panel 28 along an extension thereof between the chamber 14 and the key 26 adjacent the crimped end. The hang-panel allows the package to be hung, for example for display in the store.

Another feature of the illustrated container 12 is that the container portion which forms the wall of the food-filled chamber is a laminate of an inner, fluid-tight vapor-barrier layer 14a and a thermallyinsulating outer layer 14b. The insulating layer can, as illustrated in FIG. 1, cover only the surface portions at which a consumer is likely to hold the package and squeeze it to collapse the chamber 14. An alternative is to provide the insulating layer on all exposed walls of the chamber. The insulation protects the frozen dessert food from brief exposure to warm temperatures which otherwise could unduly temper and melt the frozen contents. The insulation also avoids discomfort to the consumer's hands during handling of the package, particularly when dispensing the frozen food.

Figure 4:
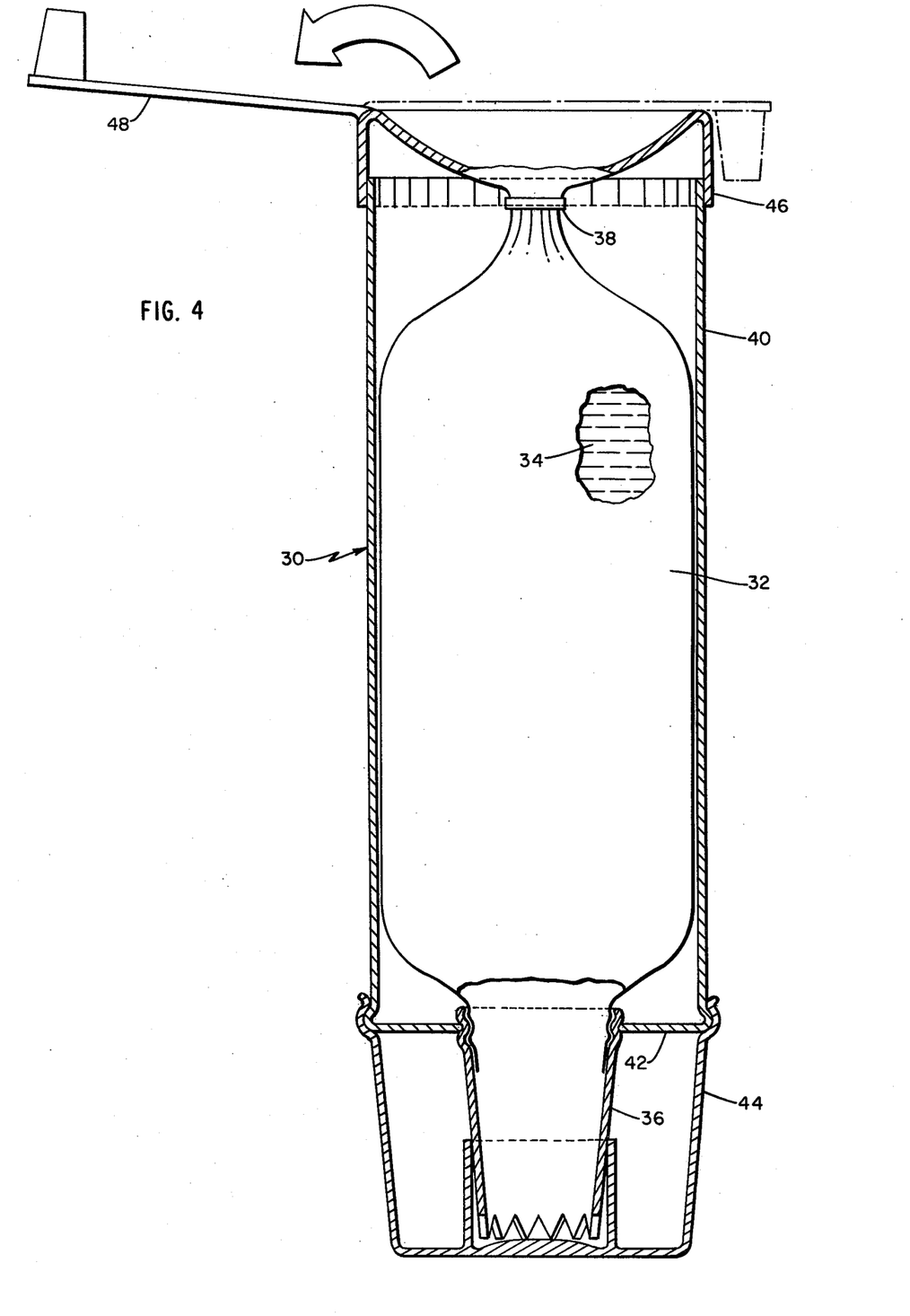
FIG. 4 shows another packaged frozen food product, with the container structure in section, embodying features of the invention.

FIG. 4 shows another packaged product 30 according to the invention and having a tubular, sausage-like pouch 32 which forms a chamber filled with the frozen dessert food 34. A dispensing nozzle 36 is secured to an open end of the pouch; the other end is sealed with a crimped closure 38. The pouch is supportingly seated in a rigid cylindrical container 40 having, at one end, a nozzle-supporting end cap 42 which supports the pouch nozzle 36. A sealing cap 44 seats on the container 40, with a removable and replaceable snap fit, in a manner which protectively covers the pouch nozzle 36.

A twist cap 46 is secured, for relative rotation, to the end of the container 40 adjacent the pouch closure 38. The cap has a rim which fits over the container and forms a pawl which engages ratchet teeth on the container. The engaged pawl and teeth restrict the cap to rotation in one direction only on the container. The pouch closure is fastened to cap 46 to rotate with it. The cap also carries a hinge-mounted crank 48 that facilitates rotation of the crank.

This ratcheting twist cap 46 provides a chamber-collapsing mechanism which enables a consumer to collapse the pouch 32 with a twisting, wringing action, for ready dispensing of the frozen food within the package.

The extrudable frozen food in the FIG. 1 chamber 14 and in the FIG. 4 pouch can be prepared with the following ingredients. As noted above, the ingredients include protein, water, sugars, emulsifiers and stabilizers. Edible fat is also provided, except in a low-fat food where it is present only incidentally, if at all. The amount and, to lesser extent, the character of each constituent depends in part on other of the constituents. The fat constituent, where used, aids in providing a creamy taste and the eating characteristic associated with ice cream-like desserts. It also contributes to the smoothness, the body and the melting resistance of the frozen dessert. The amount of fat in the product, when used, is generally in the range of 3% to 15% by weight of the product, although formulations with lesser amounts have been found satisfactory. The exact amount of fat is not critical, although the amounts of other ingredients generally are to be adjusted as the amount of fat is changed. The general amount and character of the fat constituent is in part relative to the amount of water, in which it is emulsified.

The fat constituent typically is provided in the form of triglyceride fats and/or oils, and milk fat and/or butter fat are preferred. Hence dairy cream and milk are preferred fat sources. Other edible fats and oils are believed suitable, provided they have a solid fat index within the level desired for taste and performance. Different fats and oils can be used alone or in combination with one another.

A specific function of protein in the dessert food concerns attaining high overrun. The preferred source of the protein constituent of the dessert food is milk solids not fat (MSNF). Milk solids not fat used in the preferred composition according to the invention aid in providing the desirable properties of whipping ability, smoothness, body, mouth feel, melt resistance, lowering of freezing point, and some sweetness. The MSNF can be derived from cream, milk (including condensed milk, skim milk, and condensed skim milk), and non-fat dry milk, or solely from non-fat dry milk with the addition of water. Buttermilk can also be used for a portion of the MSNF. Other protein sources with which the invention can be practiced, generally as substitution for a portion of the MSNF, include milk derived solids such as wheys, caseins, and caseinates; and further include non-milk proteins as derived from soybeans and peanuts. Protein constituent is selected, in part, in view of the fat level desired in the product and generally accounts for approximately 3% to 7% by weight of the new dessert, with 4% to 5% considered preferable.

Water is present in the dessert food as a dispersion medium for the other ingredients of the emulsified product. The portion of water in the food which remains unfrozen, due to the freezing point depression caused by sugars, provides fluidity for the product. Moreover, the portion of water which does freeze forms ice crystals that give the food rigidity as well as the refreshing taste perception characteristic of a frozen dessert.

The water content of the fat-containing dessert food which the invention uses generally constitutes from 43% to 63% by weight of the product, including the water present in other ingredients, e.g. milk and cream. This corresponds to a level of total solids between 57% and 37%. Water preferably constitutes around 53% of the product. A low-fat formulation of the food has approximately 53% to 60% water.

The flavoring constituent of the soft serve dessert is selected from known flavoring ingredients according to the desired taste, taking into account the other ingredients. This constituent includes, by way of illustration, cocoa, fruits, nuts, and the like as well as other flavorings, both natural and artificial. Note, however, that the ingredient ranges specified herein, unless stated otherwise, are for an unflavored product and for a product flavored with a concentrate, e.g. vanilla, present in only a small amount by weight. Those skilled in the art will comprehend the adjustments appropriate for the particular flavoring used.

The sugar constituent of the soft serve dessert is a combination of saccharides that provides simultaneous control of freezing point depression, sweetness, body and texture, and flavor. The combination of saccharides which the invention provides depresses the product freezing point for the desired extrusion. Too much saccharide or an unsuitable saccharide combination can cause the product to be too soft, unduly sweet, and to have a burning taste sensation. An insufficient or unsuited saccharide constituent can allow excessive water freezing with the result that the food does not extrude satisfactorily at the relatively low temperature of interest.

The added sugar to attain these objectives, i.e. in addition to sugars present in the milk solids and other constituents of the fat-containing frozen food, at least includes the range of 18-30%, with 24% being preferred. Typically the added sugars plus the sugar in milk solid ingredients constitutes on the order of 30% by weight of the food. A low-fat food includes added sugar in at least a range of 25-29%, with 27% considered preferable.

The saccharide system, which as noted is considered important in providing a frozen dessert having no significant perception of burn, preferably has fructose, sorbitol and corn syrup as at least the major sugar ingredients. The corn syrup considered preferable is 36 DE (dextrose equivalent) or lower. The sugar system may, however, employ other saccharides, depending at least in part on the subjective properties desired for the final product. Suitable other sugars are sucrose, dextrose, mannitol, other corn syrups including high fructose corn syrups, starch hydrolysates, invert sugars, honey, and xylitol. It has, for example, been found that dextrose can replace all or part of the sorbitol, but generally a less desirable flavor results, in particular a burning sensation is experienced upon total replacement. A similar but lesser problem has been experienced when replacing sorbitol with high fructose corn syrup.

The stabilizer constituent also contributes to the attainment of the desired performance features of the new dessert food. It is selected to improve the ability of the product to withstand commercial shelf life and substantial heat shock without undue deterioration, and yet enable the product to hold the overrun, which typically exceeds 100%, and to maintain an organoleptic perception that is free of an undesirable gummy or slimy character. The stabilizer element contributes to the attainment of these and other objectives for the product by providing a combination of stabilization, gelling and blocking functions. It preferably also provides a protective colloid function.

The stabilizing constituent typically is in the range between 0.35% to 1.5% by weight of the dessert food. The amount varies however with factors including the amount of water, the amount of fat, if any, and the strength of the stabilizers employed. It is hence considered that the stabilizer constituent can be within a broader range.

In one practice of the invention the stabilizer system employs at least one stabilizer from each of at least three groups of stabilizers, namely stabilizing gums, i.e. water-binding gums, gelling agents, and insoluble blocking agents. The water-binding gums are present in a range generally between 0.07% and 0.4% and are selected from locust bean gum, guar gum, propylene glycol alginate, tara gum, sodium carboxymethyl cellulose (CMC), and other cellulose ethers such as methylcellulose, hydroxypropylcellulose and hydroxypropylmethyl cellulose. The amount of gelling agent also varies with several factors, as those skilled in the art will recognize, and by way of example is present, with common food-grade agents, in an amount generally ranging between 0.1% and 0.5% of the total product and is selected from gelatin, xanthan gum, carrageenan, sodium alginate and pectin. Where it is desired that the product include a wheying-off (syneresis) protective agent, i.e. a protective colloid, the gelling agent carrageenan can additionally provide this function. The blocking agent is present in an amount generally within 0.1% and 1.0% of the total product. Preferred examples of blocking additives, in addition to the blocking function other noted stabilizers provide, are microcrystalline cellulose and cellulose fibers.

A stabilizer system considered preferable for practice of the invention consists essentially of a combination of locust bean gum, guar gum, gelatin, carrageenan and microcrystalline cellulose. Those skilled in the art will recognize that each group of stabilizers is denominated herein by a primary function, although stabilizing ingredients typically have multiple functions. For example, gelatin can serve both as a water-binding gum and as a gelling agent; and xanthan can serve as a water-binding gum alone or, additionally, as a gelling agent in combination with locust bean gum. Further, in a preferred practice, carrageenan is classified above as a gelling agent although it is also a water-binding gum and provides a protective-colloid function. Hence others skilled in this art of food additives may practice the invention with other stabilizing systems within the scope of these teachings.

The proper emulsifier constituent for practice of the invention controls the degree of emulsification of the frozen food during manufacture to aid in attaining coneability, and, it is understood, extrudability. The emulsifier constituent also serves as both a whipping agent and a drying agent in the dessert food.

The emulsifier constituent of the dessert food is in most instances present in the range between 0.2% to 1.2% of the total food. In at least a preferred instance, the emulsifier ingredients can be whipping agents such as mono- and diglycerides and distilled monoglycerides, and drying agents such as polysorbate 80, polysorbate 65, and ethoxylated mono- and diglycerides. These are considered illustrative of other food grade emulsifiers with which the invention may be practiced. An emulsifier system found preferable is a combination of mono- and diglycerides and polysorbate 80, and additionally, in a low-fat food, distilled monoglycerides.

In addition to the foregoing ingredients, the soft serve dessert food can include other food-grade ingredients, non-limiting examples being lower chain monohydric and polyhydric alcohols, starches, inorganic salts, and pH buffering agents.

The preparation of the frozen dessert food according to the invention employs processing equipment conventional for ice cream, both hard and conventional soft serve, but as set forth below differs from the overall conventional processing. The ingredients are first combined and well mixed, typically by continuous stirring as the ingredients are introduced. The mixed combination is heated as required for pasteurization and to heat treat certain ingredients. In particular, the heating places those stabilizers which are insoluble in cold water into water solution, liquifies fats, and hydrates proteins. The heat treatment preferably employs a relatively low pasteurization temperature, e.g. maintaining the combination at 155° F. for thirty minutes, but can be carried out at higher temperatures for correspondingly shorter times up to on the order of 300° F. for two seconds. The lower temperature heat treatment is considered preferable to attain better taste in the resultant dessert product.

The heated ingredients are homogenized to form an emulsion, typically with the commonly-used two-stage homogenizing equipment. This equipment is preferably operated with an homogenization pressure in the first stage on the order of 2,000 psi and a second stage pressure on the order of 500 psi. These pressures, however, are not considered critical, and other homogenizing pressures can be used.

The homogenized mixture is cooled as required to complete pasteurization. It is considered preferable that the homogenized mixture be cooled at least to 70° F. quickly after homogenization. The further cooling can occur thereafter. This prompt initial cooling maintains a manageable viscosity in the mixture, so that it can be processed without clogging or plugging the processing equipment. An undesirably thicker product results from slower initial cooling. In one practice, by way of non-limiting example, the initial cooling is effected within a minute of homogenization.

The cooled mixture resulting from the preceding step is subjected to freezing and aeration. The aeration is sufficient to attain an overrun ranging within 100% and 220%. The overrun considered preferable for a fat-containing food is in the range of 160% to 200% and is in a lower range for a low fat food.

The freezing and aeration can, for example, be performed with a conventional ice cream freezer which whips the product while dropping its temperature to below freezing. The whipping and freezing operation is continued until the food product has attained the desired specific gravity at a temperature below 24° F., preferably in the range of 15° F. to 20° F. The frozen food is removed from the equipment at this temperature and packaged, after which the packaged product is hardened by reducing the temperature to below 0° F.

The resultant frozen dessert food in the described packaged products, with the composition and overrun described, possesses the desired physical and organoleptic properties discussed above. It accordingly fully meets the required and desired properties for the new food product.

EXAMPLE 1

One example of the dessert food formulated with fat and processed in the foregoing manner and deemed preferable for one practice of the invention is prepared in the foregoing manner with the following ingredients (weight percent).

11% fat, provided as butter fat
11% MSNF, provided as milk and milk powder
3% fructose, provided as crystalline fructose as marketed for example by the Hoffman-LaRoche Company
10.8% sorbitol
10.0% corn syrup solids, for example Star Dri 35R as marketed by A.E. Staley Co.
0.25% microcrystalline cellulose, for example Avicel RC581 as marketed by FMC Corporation
0.15% gelatin (Bloom strength 225)
0.07% locust bean gum, for example FL 70/50 as marketed by Hercules Company
0.05% guar gum, for example Hercules FG 60/70
0.02% carrageenan, for example Hercules Genulacta L100
0.4% mono- and diglycerides, for example Durem 207 as marketed by the Durkee Company
0.05% polysorbate 80
The balance of the food is water.

The frozen food is prepared as described, with an overrun preferred between 160% and 200%, and typically with 0.2% by weight table salt (NaCl), principally as a flavor enhancer. Consumer testing of the resultant dessert has verified that it is at least comparable, if not superior, to presently available commercial soft serve. The dessert has been lauded as creamy, smooth and free of burn. Moreover, the dessert well satisfies the desired deformation and flow properties at home freezer temperatures as discussed above, as well as withstanding prolonged freezer storage. The dessert food accordingly is indeed readily extrudable as a continuous extrudate, immediately upon removal from prolonged storage in a home freezer, by hand pressure on a collapsible pliable container as the structures of FIGS. 1 and 4 provide.

Laboratory tests support the attainment of new and different material properties with the dessert food of this invention. The dessert of Example 1, when prepared with an overrun in the order of 200%, was measured to have a moderately low yield value and a relatively high resistance to lateral deformation. It also exhibited an unusually short relaxation time, which is considered to facilitate extrusion to a cone or dish, even by a first time user of the new dessert. In particular, a measurement comparing the new dessert of Example 1 at 0° F. with conventional soft serve at 20° F. determined that the relaxation time of the new dessert is on the order of ten times shorter than that of conventional soft serve. In one particular measurement, for example, the new dessert exhibited a relaxation time on the order of two seconds, whereas the conventional product, at the higher temperature at which it operates, exhibited a relaxation time on the order of twenty-five seconds. These tests included conventional ice cream at the store freezer temperature of 0° F., but that product was not extrudable under reasonable pressures and hence no corresponding measurement was obtained of relaxation time.

Viscosity and shear thinning tests on the dessert of Example 1 revealed that the viscosity of the food product, at 0° F., dropped by a factor on the order of two hundred between the unstressed condition and the stress required to obtain an extrusion through a 0.62-inch diameter orifice. In the unstressed condition the viscosity was, as desired, sufficiently high to preclude unwanted flow from the extrusion container and to be coneable after recovery from extrusion. The test also established that the food product is remarkably shear thinning at 0° F.

A series of standard laboratory cone penetrometer measurements was performed on the foregoing dessert of Example 1, conventional soft serve, and two different ice creams, one a standard supermarket brand and the other a frozen pudding which contains alcohol. The dessert product of this invention exhibited the lowest yield strength. The measured penetration distances were converted to yield values according to the standard formula $$Y = KL/Z^{1.6}$$

where Y is the yield value in grams per square centimeter, L is the applied cone load in grams, Z is the measured penetration in 1/10 millimeter units, and K is a constant for the particular cone angle.

Figure 5:
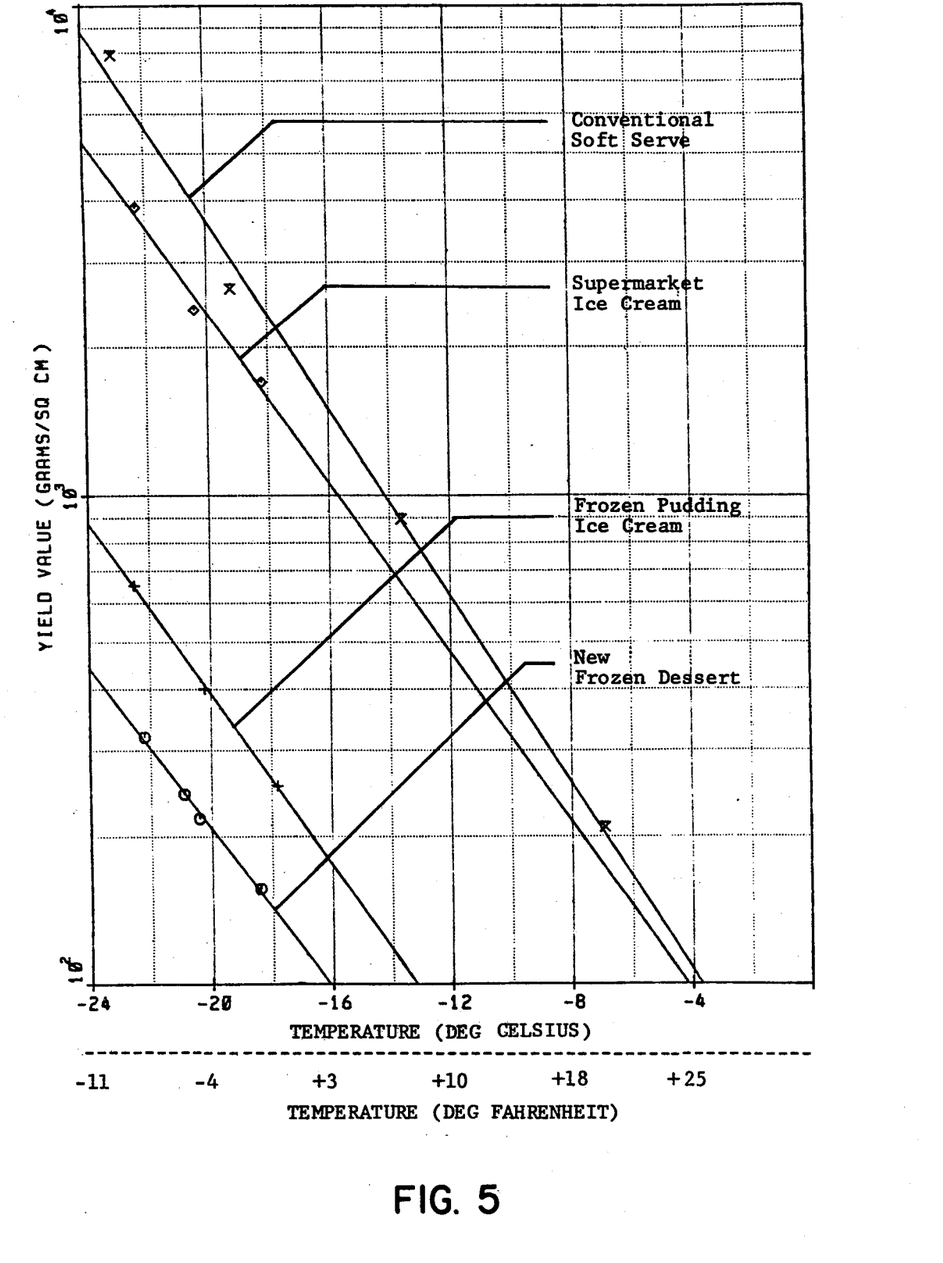
FIG. 5 is a graphical representation of yield strength, i.e. stress, as a function of temperature for the frozen food element of the packaged product of the invention and for three prior frozen dessert foods.

FIG. 5 is a semi-log plot of the yield values obtained in this manner for each of the four samples as a function of the temperatures at which the measurements were made. It is noteworthy that the product of this invention, as desired, exhibits a yield value, at the home-freezer temperature range at which it is to be extruded, of the same order of magnitude as the yield value of conventional soft serve at the higher, i.e. 16° F. to 21° F., temperatures at which it is extruded.

A further test determined that the dessert food of Example 1 has flow and deflection properties distinctly different from those of conventional soft serve, as well as from conventional supermarket ice cream. The test was conducted with the new dessert and with the ice cream at household freezer temperatures, i.e. 0° F., and with the conventional soft serve at the standard extrusion temperature of 20° F. The supermarket ice cream fractures, rather than bends, when subjected to gravity or other loading force. Conventional soft serve exhibits progressive plastic bending under these conditions. It hence deforms progressively until the load is removed. The new dessert of Example 1, on the other hand, exhibits a distinctly elastic deformation, but of relatively small magnitude. Further, the tests indicate that the new dessert of this invention is plastic while under the shear loading for extrusion, but reverts quickly to elastic behavior when the load is removed. Conventional soft serve, on the other hand, appears to be plastic under all loading conditions when in the normal extrusion temperature range of 16° F. to 21° F.

EXAMPLE 2

One example of a dietetic dessert formulated and processed in the foregoing manner for practice of the invention is prepared in the foregoing manner with the following ingredients, expressed as a percent of the weight of the ingredient mixture.

10.5% MSNF
3.5% modified whey protein
4.3% fructose
12.2% sorbitol
7.0% 36 DE corn syrup solids
3.8% 24 DE corn syrup solids
0.5% microcrystalline cellulose
0.35% gelatin (225 Bloom)
0.12% locust bean gum
0.08% guar gum
0.45% distilled mono-glyceride
0.26% mono- and di-glycerides
0.065% Polysorbate 80
0.0135% Carrageenan
0.2% salt
balance water The frozen dessert, prepared with an overrun in the order of 165%, extruded well, and exhibited satisfactory coneability and satisfactory mouth feel.

The dessert foods of Examples 1 and 2 are unflavored and can, as stated, be flavored with vanilla, for example with a concentrate that is used in only a small amount by weight. Other flavorings can be added in larger amounts, with appropriate changes in the amounts of other ingredients. It will thus be seen that the objects set forth above, including those made apparent from the preceding description, are efficiently attained. Since certain changes may be made in the composition and the product set forth, and in carrying out the foregoing process without departing from the scope of the invention, it is intended that all matter contained in the above description and shown in the accompanying drawing be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A packaged frozen product for providing in the home a frozen food of soft serve consistency, said product comprising
   A. container means having collapsible liquid-tight chamber means apertured by dispensing spout means, said chamber means being collapsible at temperatures at least in the range of 0° to 10° F. for pressuring the contents thereof sufficiently for dispensing through said spout, and
   B. a whipped emulsified frozen food within said chamber means,
   said frozen food being extrudable in continuous form and coneable at temperatures at least in the range of 0° to 10° F. for serving by extrusion from said container means at home freezer temperatures and consisting essentially, in unflavored form, of a controlled emulsion of protein, water, sugars, stabilizers, and emulsifiers,
   said protein accounting for sustantially 3% to 7% by weight of the food,
   said water accounting for substantially 53% to 60% by weight of the food,
   said sugars accounting for substantially 25% to 29% by weight of the food, and
   said emulsifiers and stabilizers accounting for substantially 1.1% to 2.7% by weight of the food.

2. A packaged frozen product for providing in the home a frozen food of soft serve consistency, said product comprising
   A. container means having collapsible liquid-tight chamber means apertured by dispensing spout means, said chamber means being collapsible at temperatures at least in the range of 0° to 10° F. for pressuring the contents thereof sufficiently for dispensing through said spout, and
   B. a whipped emulsified frozen food within said chamber means,
   said frozen food being extrudable in continuous form and coneable at temperatures at least in the range of 0° to 10° F. for serving by extrusion from said container means at home freezer temperatures and consisting essentially, in unflavored form, of a controlled emulsion of edible fat, protein, water, sugars, stabilizers, and emulsifiers,
   said edible fat accounting for up to substantially 15% by weight of the food,
   said protein accounting for substantially 3% to 7% by weight of the food,
   said water accounting for substantially 43% to 63% by weight of the food,
   said sugars accounting for substantially 18% to 30% by weight of the food, and
   said emulsifiers and stabilizers accounting for substantially 0.55% to 1.8% by weight of the food.

3. A packaged frozen food product for providing in the home a frozen food of soft serve consistency, said product comprising
   A. container means having collapsible liquid-tight chamber means apertured by dispensing spout means, said chamber means being collapsible at temperatures at least in the range of 0° to 10° F. for pressuring the contents thereof sufficiently for dispensing through said spout, and
   B. a whipped emulsified frozen food within said chamber means, said frozen food
      (1) being extrudable in substantially continuous form and coneable at said temperatures upon said collapse of said chamber means for such extrusion dispensing through said spout means, and
      (2) consisting essentially in unflavored form and aside from added fat, of a controlled emulsion comprising protein, water, sugars, stabilizers and emulsifiers,
   said stabilizers including agents providing waterbinding, gelling and blocking, and
   said emulsifiers including agents providing whipping and drying,
   said food having a yield value, as determined at 0° F. by penatrometer measurement, lower than that of conventional ice cream at the same temperature, and substantially the same as or less than that of conventional soft serve at a temperature of 16° F.

4. A packaged product according to claim 3

A. in which said container means has wall portions which are manually engageable for collapsing said chamber means, and B. further comprising sheet-like thermal insulation extending along said manually-engageable wall portions.

5. A packaged product according to claim 3 further comprising manually operable means for engagement with said container means for facilitating the dispensing collapse of said chamber means.

* * * * *